(12) United States Patent
Weingarden

(10) Patent No.: US 7,124,885 B1
(45) Date of Patent: Oct. 24, 2006

(54) HUB POSTS FOR MOUNTING INFORMATION-BEARING DISKS

(76) Inventor: Marshall L. Weingarden, 292 Myrtle St., Haworth, NJ (US) 07641

( * ) Notice: Subject to any disclaimer, the term of this patent is extended or adjusted under 35 U.S.C. 154(b) by 433 days.

(21) Appl. No.: 10/715,180

(22) Filed: Nov. 17, 2003

Related U.S. Application Data

(60) Provisional application No. 60/429,247, filed on Nov. 27, 2002.

(51) Int. Cl.
B65D 85/57 (2006.01)

(52) U.S. Cl. ........................ 206/310; 206/493

(58) Field of Classification Search ............ 206/308.1, 206/310, 493
See application file for complete search history.

(56) References Cited

U.S. PATENT DOCUMENTS

| | | |
|---|---|---|
| 3,109,539 A | 11/1963 | Turoff |
| 3,980,178 A | 9/1976 | Schidlowski |
| 4,327,831 A | 5/1982 | Inaba et al. |
| 4,623,062 A | 11/1986 | Chase et al. |
| 4,635,792 A | 1/1987 | Yamada et al. |
| 4,874,085 A | 10/1989 | Grobecker et al. |
| 4,895,252 A | 1/1990 | Nomula et al. |
| 5,332,089 A | 7/1994 | Tillett et al. |
| 5,417,324 A * | 5/1995 | Joyce et al. ............... 206/310 |
| 5,697,496 A * | 12/1997 | Bauer ...................... 206/308.1 |
| 5,735,396 A * | 4/1998 | Condorodis ............. 206/308.1 |
| 5,960,949 A * | 10/1999 | Wynalda, Jr. ........... 206/307.1 |
| 5,975,291 A * | 11/1999 | Attar et al. ............... 206/310 |
| 6,276,524 B1 * | 8/2001 | Cerda-Vilaplana et al. ...... 206/308.1 |
| 6,574,188 B1 * | 6/2003 | Fliegel .................... 720/707 |

* cited by examiner

Primary Examiner—Bryon P. Gehman
(74) Attorney, Agent, or Firm—Arthur Jacob

(57) ABSTRACT

A hub post for mounting an information-bearing disk to a substrate for presentation, storage or transportation of the disk includes a base and a post projecting from the base for engaging a mounting hole in the disk, the base carrying a layer of adhesive for affixing the hub post to the substrate, and the post being constructed of a stiffly resilient synthetic polymeric material having resilient characteristics for retaining the disk on the post against inadvertent release, while enabling ready intentional release, and renitent characteristics sufficient to resist deleterious compression and crushing while retaining the disk upon the post for selective release of the disk from the post. A flange on the hub post provides a greater basal area for affixation of the hub post to the substrate, and spaces a mounted disk from the substrate to avoid damage to an information-bearing surface of the disk.

22 Claims, 2 Drawing Sheets

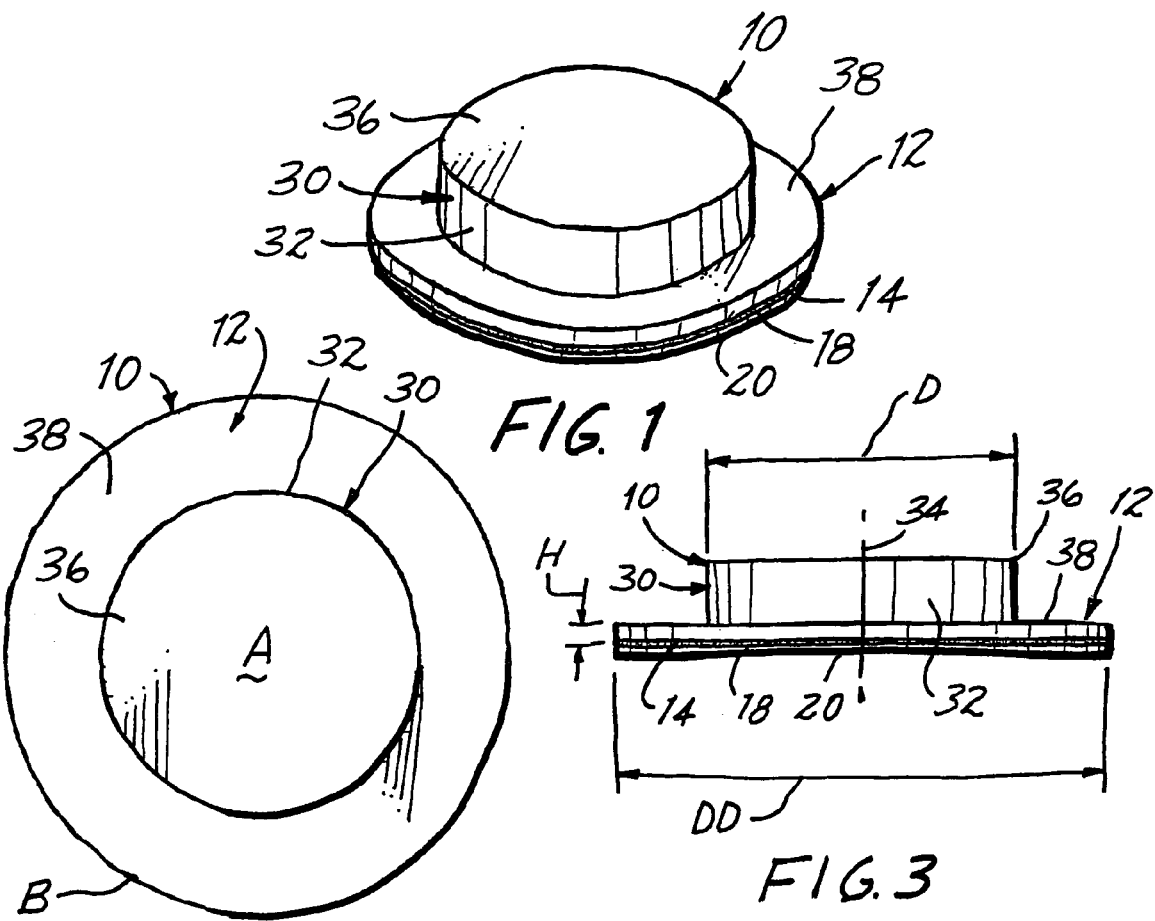

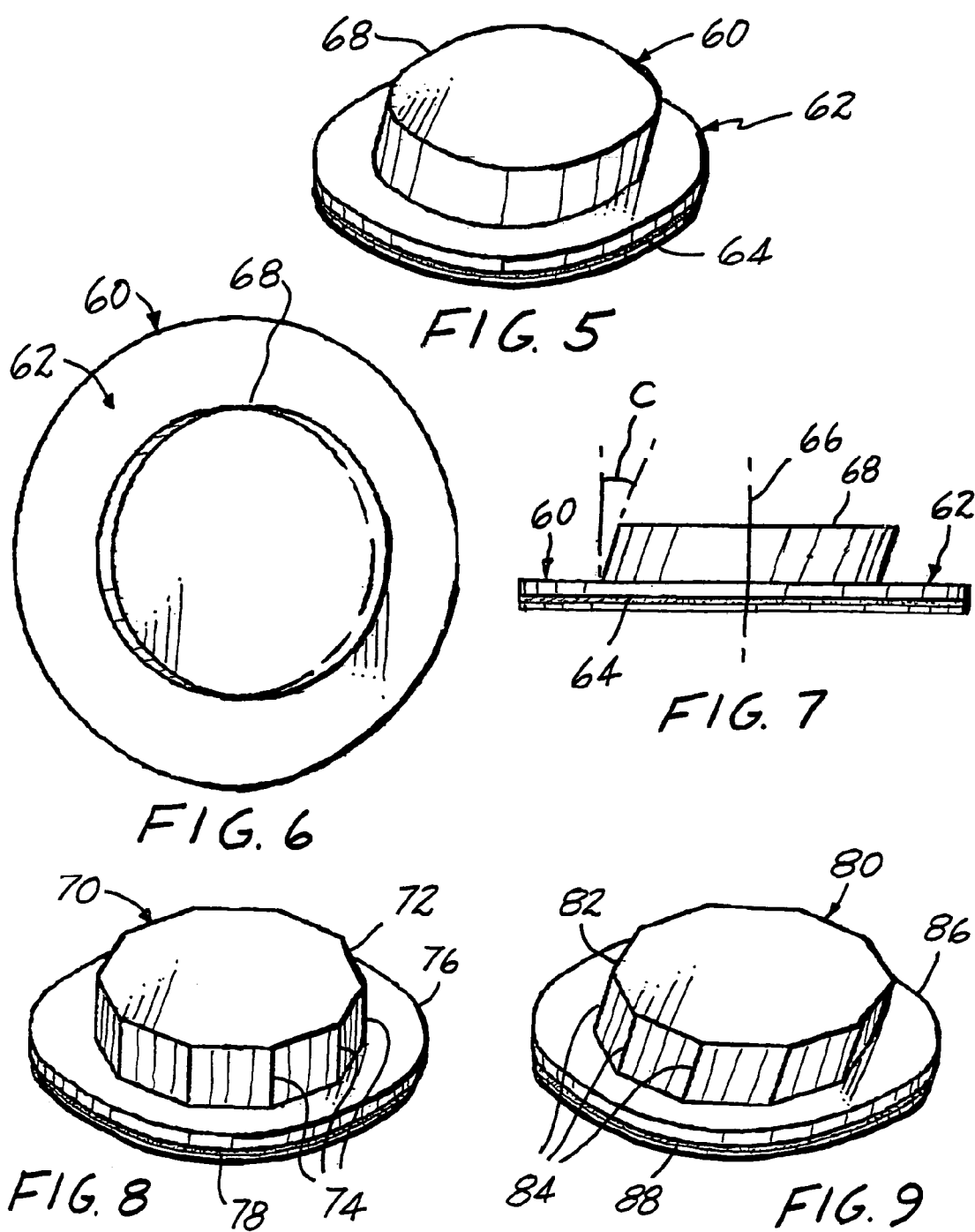

HUB POSTS FOR MOUNTING INFORMATION-BEARING DISKS

This application claims the benefit of provisional application Ser. No. 60/429,247, filed Nov. 27, 2002.

The present invention relates generally to the presentation, storage and transportation of information-bearing disks and pertains, more specifically, to hub posts for securing such a disk to a selected substrate for presentation, storage or transportation, and enabling ready selective removal of the disk for use.

For several years now, information-bearing disks, such ad CDs, CD-ROMs and DVDs, have been mounted to various structures, such as paperboard presentation folders, cards, books and magazines, as well as in packages, by means of a cylindrical or polyhedral hub post constructed of an adhesive coated resiliently compressible material, such as rubber, foam plastic and similar materials, affixed to the structure. These hub posts are provided with a diameter so related to the diameter of a mounting hole in the disk as to grip the disk with a frictional force sufficient to maintain the disk mounted upon the hub post, and enabling selective removal of the disk from the hub post for use. Currently available hub posts exhibit significant drawbacks, some of which are outlined as follows:

Hub posts constructed of foam plastic are die cut from sheets of material and consequently have a constant diameter along the entire length of the hub post. Hence, the area of the hub post available for adhesion to a selected substrate is limited to the diameter of the post, which itself is determined by the diameter of the mounting hole provided in the information-bearing disk to be mounted on the post. Since the diameter of a standard mounting hole is approximately five-eighths of an inch, the adhesive area is limited to about three-tenths of a square inch, and affixation of the post to the substrate is concomitantly limited, resulting in instances where the post becomes detached from the substrate, releasing the disk from securement on the substrate, with deleterious consequences. Moreover, the required constant diameter precludes tapering of the post. In addition, foam posts, when subjected to higher compressive stresses during shipment or storage, can be compressed to the point where the disk is released from the post, allowing the disk to become loose in a package, with consequent damage to the disk. Further, these foam posts allow the information-bearing surface of the disk to contact the substrate. Such contact can result in debilitating damage to that surface, with consequent corruption of data pertaining to the information carried at the surface, especially where the disk is a damage-sensitive DVD. Still further, the material of foam posts is opaque and masks portions of the artwork or other graphics displayed on the substrate, thus limiting the design of such graphic displays.

Vacuum formed plastic hub posts are susceptible to crushing which either can release a mounted disk from the post, allowing damage to a loose disk, or can lock a mounted disk against ready selective release. Further, vacuum formed posts, in general, are not as economical to manufacture.

The present invention overcomes the above-outlined drawbacks of current hub posts. As such, the present invention attains several objects and advantages, some of which are summarized as follows: Provides a hub post constructed of a material having a balance of resilient and renitent characteristics enabling enhanced gripping of an information-bearing disk at the central mounting hole thereof and retention of the disk upon the hub post against inadvertent removal, while allowing ready intentional selective removal; exhibits a high degree of resistance to compression, thereby essentially precluding crushing which could lead to unwanted release of a mounted disk, or locking of a mounted disk against intentional release; provides a relatively large area for adhesion of the hub post to a substrate without affecting the relatively smaller cross-sectional area required to insert the hub post into the central mounting hole of a disk to be secured on the hub post; assists in preventing damage to the information-bearing surface of an information-bearing disk secured to the hub post; enables the use of an essentially transparent material for the hub post, thereby allowing greater versatility in the design of a graphic display for use on the substrate to which the hub post is adhered; allows the use of a variety of colors, including colors in an opaque hub post, where graphic designs on a substrate do not require viewing of the area of the substrate upon which the hub post is adhered; enables economical manufacture by molding in a unitary construction; provides a simple, economical and rugged construction readily adapted to a wide variety of uses for exemplary performance with low cost.

The above objects and advantages, as well as further objects and advantages, are attained by the present invention which may be described briefly as a hub post for mounting an information-bearing disk to a substrate for presentation, storage or transportation of the disk, the disk including a mounting hole, and the hub post and the mounting hole having relative dimensions enabling gripping of the disk upon reception of the hub post within the mounting hole of the disk to secure the disk to the hub post and allow selective release of the disk from the hub post, the hub post comprising: a base having a basal surface extending in a lateral direction for juxtaposition with the substrate, the base having a longitudinal extent; a layer of adhesive on the basal surface for affixing the basal surface to the substrate; and a post projecting from the base in a generally longitudinal direction, the post including a gripping surface having lateral dimensions relative to counterpart lateral dimensions of the mounting hole of the disk for enabling selective gripping of the disk upon insertion of the post into the mounting hole, and for selective release of the post from the mounting hole; the base and the post being integral and at least the post being constructed of a stiffly resilient synthetic polymeric material having renitent characteristics for resisting deleterious compression and crushing while retaining the disk upon the post.

The present invention will be understood more fully, while still further objects and advantages will become apparent, in the following detailed description of preferred embodiments of the invention illustrated in the accompanying drawing, in which:

FIG. 1 is a pictorial view of a hub post constructed in accordance with the present invention;

FIG. 2 is a top plan view of the hub post;

FIG. 3 is a front elevational view of the hub post;

FIG. 4 is a front elevational view of the hub post shown adhered to a substrate, with an information-bearing disk secured in place, mounted on the hub post;

FIG. 5 is a pictorial view of another hub post constructed in accordance with the present invention;

FIG. 6 is a top plan view of the hub post of FIG. 5;

FIG. 7 is a front elevational view of the hub post of FIG. 5;

FIG. 8 is a pictorial view of still another hub post constructed in accordance with the present invention; and FIG. 9 is a pictorial view of yet another hub post constructed in accordance with the present invention.

Referring now to the drawing, and especially to FIGS. 1 through 4 thereof, a hub post constructed in accordance with the present invention is shown at 10 and is seen to include a base in the form of a flange 12 having a basal surface 14 extending in lateral directions for juxtaposition with a substrate 16. A layer 18 of adhesive, preferably in the form of a pressure-sensitive adhesive, is placed on the basal surface 14 for adhering the hub post 10 to the substrate 16 along the basal surface 14. A release sheet 20 covers the adhesive layer 18 and is removed from the adhesive layer 18 when the hub post 10 is to be affixed to the substrate 16, in a manner now well known in connection with the use of pressure-sensitive adhesives.

A post 30 projects from the flange 12 and includes a substantially continuous, unbroken gripping surface 32 extending along an external surface of the post 30. In the illustrated embodiment, post 30 is generally cylindrical and extends in a longitudinal upward direction, generally parallel to central axis 34 of the flange 12, to an upper end 36. Preferably, post 30 is tapered slightly toward upper end 36 for purposes set forth below. Upon affixing the hub post 10 to the substrate 16, axis 34 is generally normal to the substrate 16 and post 30 likewise projects generally normal to substrate 16. Post 30 has lateral dimensions, shown in the form of diameter D of the cylindrical configuration of post 30, and a corresponding cross-sectional area A. Flange 12 also is generally cylindrical and includes an overall diameter DD which is greater than diameter D of post 30 such that basal surface 14 extends laterally beyond the cross-sectional area A of post 30 and includes a cross-sectional area B substantially greater than cross-sectional area A. Thus, the size of cross-sectional area B of basal surface 14 is not limited by the lateral extend of cross-sectional area A of post 30 and basal surface 14 provides an area for layer 18 large enough to accommodate sufficient adhesive to assure secure affixation of hub post 10 to substrate 16. Flange 12 includes an upper, laterally extending surface 38 spaced longitudinally from basal surface 14 by the longitudinal extent of the flange 12, shown as height H, and extending laterally beyond gripping surface 32 of the post 30.

As seen in FIG. 4, once hub post 10 is affixed to substrate 16 an information-bearing disk, shown in the form of a fragment of a disk 40, is mounted selectively to substrate 16 by the reception of post 30 within a central mounting hole 42 provided in the disk 40. Disk 40 may be a CD, a CD-ROM, a DVD or the like, all of which have a mounting hole 42 with a standard diameter of approximately five-eighths of an inch and at least one information-bearing surface 44. Substrate 16 is an element of a structure provided either for presenting the disk 40, such as a paperboard presentation folder, a card, a loose-leaf binder, a book or a magazine, or for packaging the disk for storage or for transportation. In any of these structures, the disk 40 is to be secured against damage which could occur as a result of unwanted movement of the disk 40 relative to the structure or contact between an information-bearing surface 44 of the disk 40 and an adjacent portion of the structure. In addition, the securement of the disk 40 to the substrate 16 is such that selective removal of the disk 40 is available with relative ease.

To this end, the relative lateral dimensions of the mounting hole 42 and the post 30, and the physical characteristics of the material of the post 30, are such that upon insertion of the post 30 into the mounting hole 42, the gripping surface 32 grips the disk 40 with a retention force sufficient to secure the disk 40 against unwanted, inadvertent removal, while enabling ready intentional release for selectively removing the disk 40 from securement to the substrate 16. Thus, post 30 is constructed of a stiffly resilient synthetic polymeric material having a balance of resilient characteristics and renitent characteristics establishing frictional gripping forces sufficient to retain the disk 40 secured to the post 30 against unwanted release during presentation, storage or transportation, while enabling ready intentional release for selective removal of the disk 40 from the post 30. A preferred material having the requisite characteristics is a urethane having a durometer of about 55 to 65 on the Shore A scale. Hub posts 10 advantageously are molded of such a material in a preferred unitary construction, in which post 30 is unitary with flange 12, and provide the characteristics which enable secure retention of disk 40 on post 30, and ready selective release of disk 40 from post 30. The slight taper of post 30 toward upper end 36 facilitates insertion of post 30 into mounting hole 42 and securement of disk 40 on post 30, as well as subsequent selective release and removal of disk 40 from post 30.

With disk 40 retained on post 30, as illustrated in FIG. 4, the central portion of disk 40, that is, the annular portion 46 immediately adjacent mounting hole 42, which portion 46 bears no data which could be corrupted by contact with another surface, confronts and preferably is seated against upper surface 38 of flange 12, and information-bearing surface 44 is spaced from substrate 16 so as to prevent any contact between substrate 16 and the information-bearing surface 44 which could damage the information-bearing surface 44 and corrupt data carried by information-bearing surface 44. The stiffly resilient material of hub post 10 possesses sufficient renitence to resist deleterious compression which could result in unwanted release of the disk 40 from the post 30. Further, the resistance to compression precludes unwanted crushing and concomitant locking of the disk 40 to the post 30.

As set forth above, the preferred manufacture of hub post 10 is by molding the hub post 10 in a unitary construction of a synthetic polymeric material. By choosing an essentially transparent material, any graphic display located on the upper surface 50 of the substrate 16 is not masked by hub post 10, thus enabling a greater latitude in the design of graphics having portions viewable through the material of hub post 10. Where such graphic display masking is not a consideration, hub post 10 can be molded of an opaque or translucent material, and can be provided with any one of a variety of aesthetically pleasing colors, or colors chosen for coding purposes.

Turning now to the embodiment illustrated in FIGS. 5 through 7, an alternate hub post 60 includes a base in the form of flange 62 having a basal surface 64 extending laterally, and a central axis 66 extending in a generally longitudinal direction, essentially normal to basal surface 64, as in the embodiment described above in connection with FIGS. 1 through 4. However, in order further to guard against a disk inadvertently being released from the hub post 60, post 68 of hub post 60 is canted slightly relative to axis 66 by a small angle C. The small angle C is great enough to deter inadvertent release of a disk from post 68, but not so great as to significantly impede intentional, selective releases. Angle C preferably is up to about 5°.

The embodiments illustrated in FIGS. 8 and 9 are similar to the embodiments of FIGS. 1 and 5, respectively, with respect to the relationship between a base and a post of a hub post constructed in accordance with the present invention. However, the hub post 70 includes a post 72 which, rather than having a cylindrical configuration, includes a polyhedral configuration. Likewise, hub post 80 includes a post 82 having a polyhedral configuration. The polyhedral configuration reduces the area of contact between a post 72 or a post 82 and a disk gripped by the post; that is, contact between the post 72 or 82 and the mounting hole of a mounted disk will occur only at respective points 74 or 84, thereby easing somewhat the insertion of the post into the mounting hole of the disk, as well as facilitating selective removal of the disk, without affecting the ability of the hub post to mount the disk on a substrate with requisite security. Flanges 76 and 86, while shown cylindrical, may be provided in other configurations such as, for example, matching polyhedral configurations, without affecting the provision of a sufficient affixation area in basal surfaces 78 or 88.

It will be seen that the present invention attains all of the objects and advantages summarized above, namely: Provides a hub post constructed of a material having a balance of resilient and renitent characteristics enabling enhanced gripping of an information-bearing disk at the central mounting hole thereof and retention of the disk upon the hub post against inadvertent removal, while allowing ready intentional selective removal; exhibits a high degree of resistance to compression, thereby essentially precluding crushing which could lead to unwanted release of a mounted disk, or locking of a mounted disk against intentional release; provides a relatively large area for adhesion of the hub post to a substrate without affecting the relatively smaller cross-sectional area required to insert the hub post into the central mounting hole of a disk to be secured on the hub post; assists in preventing damage to the information-bearing surface of an information-bearing disk secured to the hub post; enables the use of an essentially transparent material for the hub post, thereby allowing greater versatility in the design of a graphic display for use on the substrate to which the hub post is adhered; allows the use of a variety of colors, including colors in an opaque hub post, where graphic designs on a substrate do not require viewing of the area of the substrate upon which the hub post is adhered; enables economical manufacture by molding in a unitary construction; provides a simple, economical and rugged construction readily adapted to a wide variety of uses for exemplary performance with low cost.

It is to be understood that the above detailed description of preferred embodiments of the invention is provided by way of example only. Various details of design and construction may be modified without departing from the true spirit and scope of the invention as set forth in the appended claims.

The invention claimed is:

1. A hub post for mounting an information-bearing disk to a substrate for presentation, storage or transportation of the disk, the disk including a mounting hole, and the hub post and the mounting hole having relative dimensions enabling gripping of the disk upon reception of the hub post within the mounting hole of the disk to secure the disk to the hub post and allow selective release of the disk from the hub post, the hub post comprising:
   a base having a basal surface extending in a lateral direction for juxtaposition with the substrate, the base having a longitudinal extent;
   a layer of adhesive on the basal surface for affixing the basal surface to the surface; and
   a post projecting from the base in a generally longitudinal direction, the post including a substantially continuous, unbroken gripping surface having lateral dimensions relative to counterpart lateral dimensions of the mounting hole of the disk for enabling selective gripping of the disk upon insertion of the post into the mounting hole, and for selective release of the post from the mounting hole;
   the base and the post being integral and at least the post being substantially solid and constructed of a stiffly resilient synthetic polymeric material having a durometer providing a balance of resilient characteristics and renitent characteristics for establishing the aforesaid selective gripping and selective release and for resisting deleterious compression and crushing while retaining the disk upon the post, the material being a urethane.

2. The hub post of claim 1 wherein the base and post are molded in a unitary structure.

3. The hub post of claim 1 wherein the material is substantially solid throughout the base and post.

4. The hub post of claim 1 wherein the material is substantially transparent for enabling viewing of the substrate through the base.

5. The hub post of claim 1 wherein the longitudinal extent of the base spaces the gripping surface from the basal surface for spacing the disk from the substrate when the basal surface is adhered to the substrate and the post is received within the mounting hole of the disk.

6. The hub post of claim 5 wherein the post includes a lateral cross-sectional area, and the base comprises a flange projecting laterally beyond the gripping surface of the post such that the basal surface extends along an area greater than the lateral cross-sectional area of the post.

7. The hub post of claim 6 wherein the flange includes a laterally extending surface spaced longitudinally from the basal surface by the longitudinal extent of the base such that upon seating of the disk on the post, the disk confronts the laterally extending surface of the flange, with the disk spaced longitudinally from the substrate by the longitudinal extent of the base.

8. The hub post of claim 7 wherein the flange includes a central longitudinal axis for extending substantially normal to the substrate upon juxtaposition of the basal surface with the substrate, and the post extends along the longitudinal axis.

9. The hub post of claim 7 wherein the base and post are molded in a unitary structure.

10. The hub post of claim 7 wherein the material is substantially solid throughout the base and post.

11. The hub post of claim 7 wherein the material is substantially transparent for enabling viewing of the substrate through the base.

12. The hub post of claim 7 wherein the post is generally cylindrical.

13. The hub post of claim 7 wherein the material has a durometer of about 55 to 65 Shore A.

14. The hub post of claim 1 wherein the post is generally cylindrical.

15. The hub post of claim 1 wherein the post is polyhedral.

16. The hub post of claim 1 wherein the material has a durometer of about 55 to 65 Shore A.

17. A hub post for mounting an information-bearing disk to a substrate for presentation, storage or transportation of the disk, the disk including a mounting hole, and the hub post and the mounting disk having relative dimensions enabling gripping of the disk upon reception of the hub post within the mounting hole of the disk to secure the disk to the hub post and allow selective release of the disk from the hub post, the hub post comprising:

a base having a basal surface extending in a lateral direction for juxtaposition with the substrate, the base having a longitudinal extent;

a layer of adhesive on the basal surface for affixing the basal surface to the substrate; and a post projecting from the base in a generally longitudinal direction, the post including a substantially continuous, unbroken gripping surface having lateral dimensions relative to counterpart lateral dimensions of the mounting hole of the disk for enabling selective gripping of the disk upon insertion of the post into the mounting hole, and for selective release of the post from the mounting hole;

the base and the post being integral and at least the post being substantially solid and constructed of a stiffly resilient synthetic polymeric material having a durometer providing a balance of resilient characteristics and renitent characteristics for establishing the aforesaid selective gripping and selective release and for resisting deleterious compression and crushing while retaining the disk upon the post, the material having a durometer of about 55 to 65 Shore A.

18. A hub post for mounting an information-bearing disk to a substrate for presentation, storage or transportation of the disk, the disk including a mounting hole, and the hub post and the mounting hole having relative dimensions enabling gripping of the disk upon reception of the hub post within the mounting hole of the disk to secure the disk to the hub post and allow selective release of the disk from the hub post, the hub post comprising:

a base having a basal surface extending in a lateral direction for juxtaposition with the substrate, the base having a longitudinal extent, the longitudinal extent of the base spacing the gripping surface from the basal surface for spacing the disk from the substrate when the basal surface is adhered to the substrate and the post is received within the mounting hole of the disk;

a layer of adhesive on the basal surface for affixing the basal surface to the substrate; and a post projecting from the base in a generally longitudinal direction, the post including a substantially continuous, unbroken gripping surface having lateral dimensions relative to counterpart lateral dimensions of the mounting hole of the disk for enabling selective gripping of the disk upon insertion of the post into the mounting hole, and for selective release of the post from the mounting hole, the post including a lateral cross-sectional area, and the base comprising a flange projecting laterally beyond the gripping surface of the post such that the basal surface extends along an area greater than the lateral cross-sectional area of the post, the flange including a laterally extending surface spaced longitudinally from the basal surface by the longitudinal extent of the base such that upon seating of the disk on the post, the disk confronts the laterally extending surface of the flange, with the disk spaced longitudinally from the substrate by the longitudinal extend of the base;

the base and the post being integral and at least the post being substantially solid and constructed of a stiffly resilient synthetic polymeric material having a durometer providing a balance of resilient characteristics and renitent characteristics for establishing the aforesaid selective gripping and selective release and for resisting deleterious compression and crushing while retaining the disk upon the post, the flange including a central longitudinal axis for extending substantially normal to the substrate upon juxtaposition of the basal surface with the substrate, and the post being canted at a small angle to the central longitudinal axis.

19. The hub post of claim 18 wherein the small angle is up to about 5°.

20. A hub post for mounting an information-bearing disk to a substrate for presentation, storage or transportation of the disk, the disk including a mounting hole, and the hub post and the mounting hole having relative dimensions enabling gripping of the disk upon reception of the hub post within the mounting hole of the disk to secure the disk to the hub post, and allow selective release of the disk from the hub post, the hub post comprising:

a base having a basal surface extending in a lateral direction for juxtaposition with the substrate, the base having a longitudinal extent, the longitudinal extent of the base spacing the gripping surface from the basal surface for spacing the disk from the substrate when the basal surface is adhered to the substrate and the post is received within the mounting hole of the disk;

a layer of adhesive on the basal surface for affixing the basal surface to the substrate; and a post projecting from the base in a generally longitudinal direction, the post including a substantially continuous, unbroken gripping surface having lateral dimensions relative to counterpart lateral dimensions of the mounting hole of the disk for enabling selective gripping of the disk upon insertion of the post into the mounting hole, and for selective release of the post from the mounting hole, the post including a lateral cross-sectional area, and the base comprising a flange projecting laterally beyond the gripping surface of the post such that the basal surface extends along an area greater than the lateral cross-sectional area of the post, the flange including a laterally extending surface spaced longitudinally from the basal surface by the longitudinal extent of the base such that upon seating of the disk on the post, the disk confronts the laterally extending surface of the flange, with the disk spaced longitudinally from the substrate by the longitudinal extend of the base;

the base and the post being integral and at least the post being substantially solid and constructed of a stiffly resilient synthetic polymeric material having a durometer providing a balance of resilient characteristics and renitent characteristics for establishing the aforesaid selective gripping and selective release and for resisting deleterious compression and crushing while retaining the disk upon the post, the material having a durometer of about 55 to 65 Shore A.

21. A hub post for mounting an information-bearing disk to a substrate for presentation, storage or transportation of the disk, the disk including a mounting hole, and the hub post and the mounting hole having relative dimensions enabling gripping of the disk upon reception of the hub post within the mounting hole of the disk to secure the disk to the hub post and allow selective release of the disk from the hub post, the hub post comprising:

a base having a basal surface extending in a lateral direction for juxtaposition with the substrate, the base having a longitudinal extent, the longitudinal extent of the base spacing the gripping surface from the basal surface for spacing the disk from the substrate when the basal surface is adhered to the substrate and the post is received within the mounting hole of the disk;

a layer of adhesive on the basal surface for affixing the basal surface to the substrate; and a post projecting from the base in a generally longitudinal direction, the post including a substantially continuous, unbroken gripping surface having lateral dimensions relative to counterpart lateral dimensions of the mounting hole of the disk for enabling selective gripping of the disk upon insertion of the post into the mounting hole, and for selective release of the post from the mounting hole, the post including a lateral cross-sectional area, and the base comprising a flange projecting laterally beyond the gripping surface of the post such that the basal surface extends along an area greater than the lateral cross-sectional area of the post, the flange including a laterally extending surface spaced longitudinally from the basal surface by the longitudinal extent of the base such that upon seating of the disk of the post, the disk confronts the laterally extending surface of the flange, with the disk spaced longitudinally from the substrate by the longitudinal extend of the base;

the base and the post being integral and at least the post being substantially solid and constructed of a stiffly resilient synthetic polymeric material having a durometer providing a balance of resilient characteristics and renitent characteristics for establishing the aforesaid selective gripping and selective release and for resisting deleterious compression and crushing while retaining the disk upon the post, the post being polyhedral.

22. A hub post for mounting an information-bearing disk to a substrate for presentation, storage or transportation of the disk, the disk including a mounting hole, and the hub post and the mounting hole having relative dimensions enabling gripping of the disk upon reception of the hub post within the mounting hole of the disk to secure the disk to the hub post and allow selective release of the disk from the hub post, the hub post comprising:

a base having a basal surface extending in a lateral direction for juxtaposition with the substrate, the base having a longitudinal extent;

a layer of adhesive on the basal surface for affixing the basal surface to the substrate; and a post projecting from the base in a generally longitudinal direction, the post including a substantially continuous, unbroken gripping surface having lateral dimensions relative to counterpart lateral dimensions of the mounting hole of the disk for enabling selective gripping of the disk upon insertion of the post into the mounting hole, and for selective release of the post from the mounting hole;

the base and the post being integral and at least the post being substantially solid and constructed of a stiffly resilient synthetic polymeric material having a durometer providing a balance of resilient characteristics and renitent characteristics for establishing the aforesaid selective gripping and selective release and for resisting deleterious compression and crushing while retaining the disk upon the post, the post being polyhedral.

* * * * *